US011610008B2

(12) United States Patent
Keller et al.

(10) Patent No.: US 11,610,008 B2
(45) Date of Patent: Mar. 21, 2023

(54) SNAP-IN SECRET SERVER SUPPORT FOR PROTECTING SECRET INFORMATION

(71) Applicant: CITRIX SYSTEMS, INC., Fort Lauderdale, FL (US)

(72) Inventors: Steven A. Keller, Coral Springs, FL (US); Abraham Mir, Wellington, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 174 days.

(21) Appl. No.: 16/951,086

(22) Filed: Nov. 18, 2020

(65) Prior Publication Data

US 2022/0156387 A1 May 19, 2022

(51) Int. Cl.
*G06F 21/60* (2013.01)
*H04L 9/40* (2022.01)
*G06F 9/455* (2018.01)

(52) U.S. Cl.
CPC ........ *G06F 21/604* (2013.01); *G06F 9/45558* (2013.01); *G06F 21/602* (2013.01); *H04L 63/10* (2013.01); *G06F 2009/45595* (2013.01)

(58) Field of Classification Search
CPC .. G06F 21/604; G06F 21/554; G06F 9/45558; G06F 2009/45595; G06F 21/54; G06F 21/566; G06F 21/602; H04L 63/10
See application file for complete search history.

(56) References Cited

U.S. PATENT DOCUMENTS

| 2015/0254455 | A1  | 9/2015 | Sandhu et al. | |
|---|---|---|---|---|
| 2018/0103033 | A1* | 4/2018 | Kalitin | H04L 69/40 |
| 2022/0109667 | A1* | 4/2022 | Gorog | G06F 21/64 |

OTHER PUBLICATIONS

Wang et al. "MJBlocker: A Lightweight and Run-time Malicious JavaScript Extensions Blocker" 2013 7th International Conference on Software Security and Reliability; p. 10.

* cited by examiner

*Primary Examiner* — Frantz B Jean

(57) ABSTRACT

A computer system includes a memory to store an application. A processor is configured to start the application, and insert a secret-server hook into the application during start-up. The secret-server hook has instructions to access a secret server with the secret information stored therein. In response to a call being made by the application for the secret information, the secret-server hook has further instructions to intercept the call, and provide the secret information in the secret server to the application based on the intercepted call.

20 Claims, 17 Drawing Sheets

FIG. 9

```
"AppSecretConfigurations"                                              ⟵ 540
"Name": "SampleApp"
"Local"                                                                ⟵ 542
    // Local configuration provider determines the type of interface that is being used to access the
    // configuration that contains the secrets. This will be used by the associated hook.
    // File, Registry
    "ConfigProvider": "file"
    "ConfigPath": "c:\\sample\\config.json"
    // Local configuration type determines how to process the file for search and replace.
    // JSON, XML
    "ConfigType": "JSON"
"Remote"                                                               ⟵ 544
    // Remote configuration type determines which secret service interface should be used when
    // obtaining the secrets.
    // AzureKeyVault, HashiCorpVault
    "ConfigProvider": "AzureKeyVault"
    "ConfigPath": "sample.config.json"
    //
    // Remote configuration connection contains the information required by the secret service
    // provider(interface defined above) to establish a connection – this is like a connection string.
    //
    "ConfigConnection": "connection info"
    // Secret names are the actual configuration names within either the "File" or "Registry" as
    // determined by the Local Config provider.
    "SecretNames"
        "Secret1"
        "Secret2"
        "Secret3"
```

FIG. 15

SNAP-IN SECRET SERVER SUPPORT FOR PROTECTING SECRET INFORMATION

TECHNICAL FIELD

The present disclosure relates to computer systems, and more particularly, to protecting secret information on a computer system.

BACKGROUND

Traditionally, personal computer systems within an organization include combinations of operating systems, applications, and user settings, which are each managed individually by owners or administrators on an ongoing basis. Some applications require secret information to access a desired resource, such as a database or a cloud service provider, for example.

Secret information may be usernames and passwords, database connection strings, and service keys, for example. The secret information is typically stored on a computer system in a local storage, such as a configuration file or a registry. The configuration file and registry are in plain text (i.e., unencrypted text). This allows an administrator to go in and change the settings when needed, including the secret information.

A drawback of storing the secret information in plain text in the configuration file or registry is that the secret information may be easily read by other users having access to the computer system. If a user has malicious intentions, then the secret information may be used for illicit purposes. Consequently, there is a need to protect secret information on a computer system.

SUMMARY

A computer system includes a memory configured to store an application. A processor is coupled to the memory and is configured to start the application, and insert a secret-server hook into the application during start-up. The secret-server hook has instructions to access a secret server with secret information stored therein. In response to the application making a call for the secret information, the secret-server hook intercepts the call, and provides the secret information in the secret server to the application based on the intercepted call. If the call being made by the application is not a request for the secret information, then the secret-server hook will simply return the results of the request.

After the call is made for the secret information, the secret-server hook may have further instructions to redirect the intercepted call to the secret server to retrieve the secret information from the secret server.

Before the call is made for the secret information, the secret-server hook may have further instructions to retrieve and cache the secret information from the secret server. The secret information may be cached using a protective storage.

The call being made for the secret information is directed to a configuration file or registry that includes blank information instead of the secret information initially stored therein, and after interception of the call, the secret-server hook may have further instructions to search and replace the blank information in the configuration file or registry with the secret information from the secret server, and return an updated configuration file or registry to the application.

The call being made for the secret information is directed to a configuration file or registry, wherein the secret server may be configured to store the same configuration file or registry information, and after interception of the call, the secret-server hook may have further instructions to return the configuration file or registry information from the secret server to the application.

The secret information in the secret server may be stored as name value pairs, a single encoded string, or a format dependent on the secret server. The memory and the processor may be in a virtual machine. The resource being accessed by the application may be external the computer system.

Another aspect is directed to a method for operating the computer system as described above. The method includes storing in memory an application. A processor is coupled to the memory and is operated to start the application, and insert a secret-server hook into the application during start-up. The secret-server hook has instructions to access a secret server with the secret information stored therein. In response to a call being made by the application for the secret information, the secret-server hook intercepts the call, and provides the secret information in the secret server to the application based on the intercepted call. If the call being made by the application is not a request for the secret information, then the secret-server hook will simply return the results of the request.

Yet another aspect is directed to a computing system comprising the secret server and the computer system as described above.

BRIEF DESCRIPTION OF THE DRAWINGS

FIG. 9 is an example list of DLLs that are to be loaded for an application operating on the computer system illustrated in FIG. 6.

FIG. 15 provides instructions for the configuration necessary for the secret server snap-in to determine the requests to be hooked and the configuration necessary to access the secret server for an application operating on the computer system illustrated in FIG. 6.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Security is a priority in organizations to protect secret information in computer systems. Local storage, such as configuration files and registries stored in a persistent memory, are often used to store the secret information needed by applications running on the computer systems. The configuration files and registries are in plain text. This allows anyone accessing the computer systems to read the secret information.

One approach to protect the secret information is to keep the configuration files and registries in locked down repositories or file shares. Another approach is to keep the secret information in a secret server, such as a Thycotic Secret Server, for example. However, these approaches require modifications to the application code to direct where the secret information is being kept. This is a time consuming and labor intensive process, particularly when dealing with a large quantity of applications, which typically include legacy applications.

The techniques and teachings of the present disclosure provide the ability for a computer system to retrieve the secret information from a secret server without having to change the application code. Instead, the secret information normally stored as plain or unencrypted text in a configuration file or registry in the computer system is replaced with blank information.

A secret server snap-in hook is loaded into the application at application start-up. The secret server snap-in hook intercepts all configuration file and registry calls made by the application, and determines when one of the calls is for secret information. If the call is for secret information, then the call is intercepted and redirected by the secret server snap-in hook to the secret server to retrieve the secret information. If the call is not for secret information, then the secret server snap-in hook allows the call to pass to the configuration file or registry so that the contents therein are returned to the application.

Figure 1:
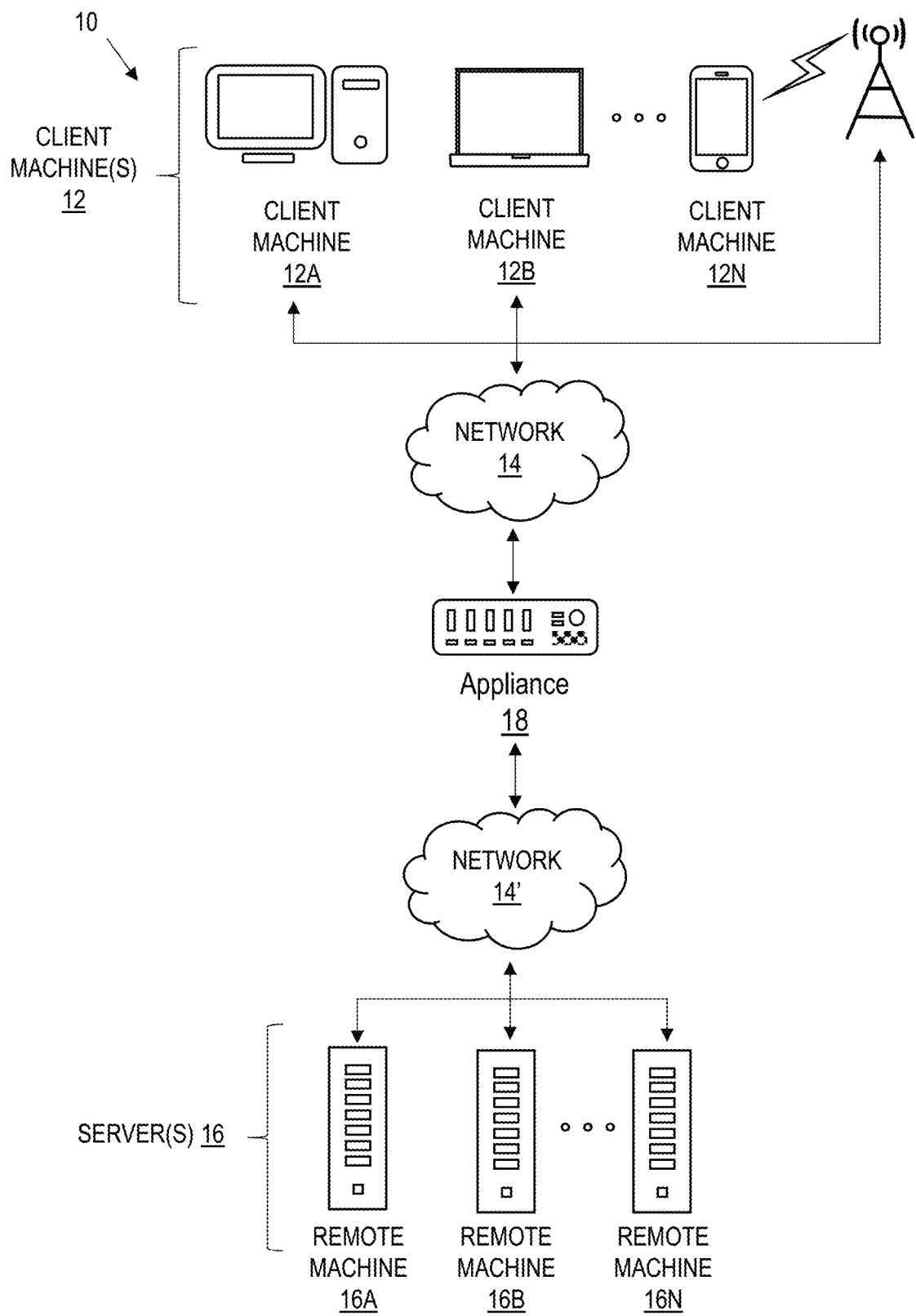
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
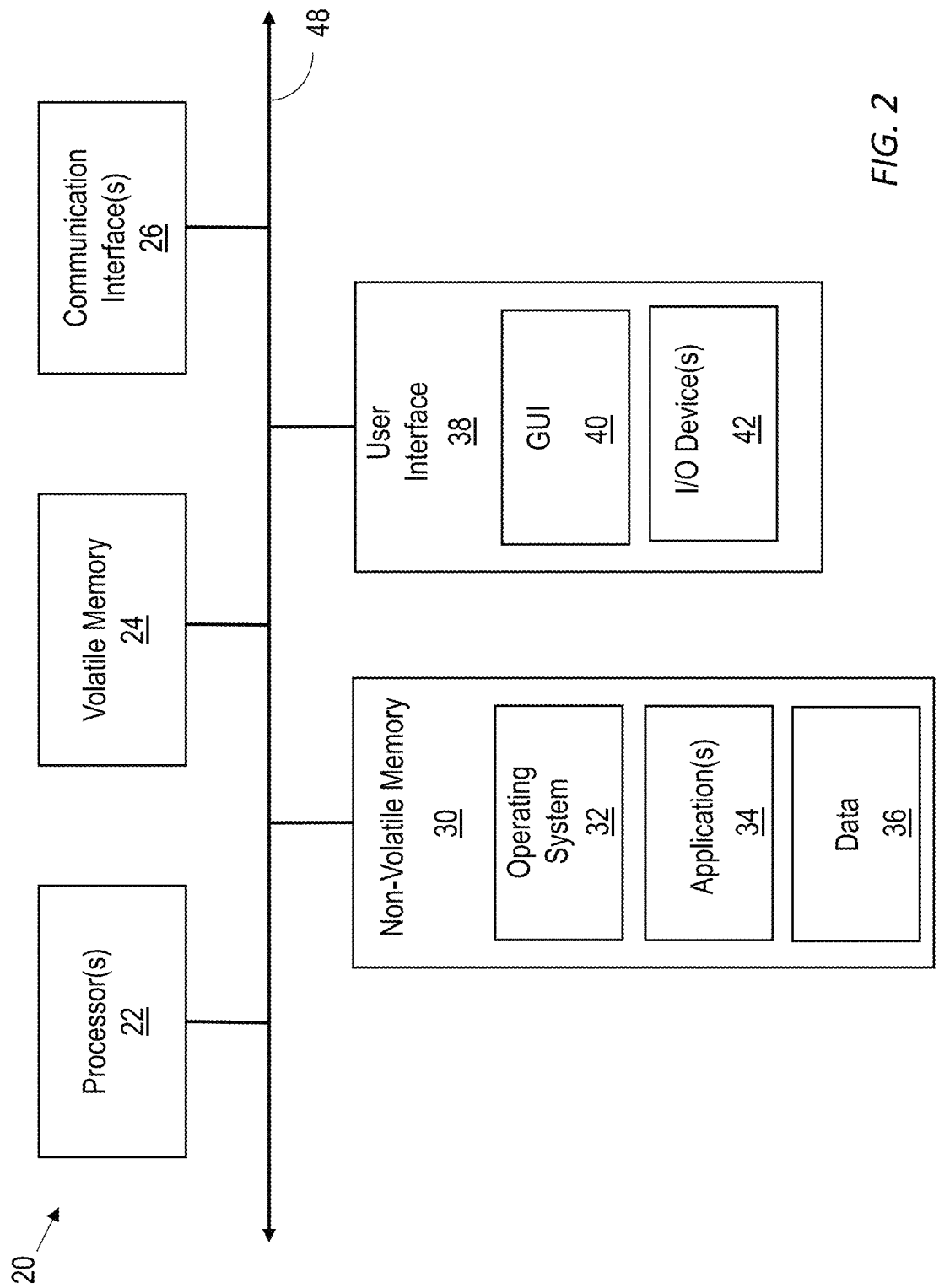
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
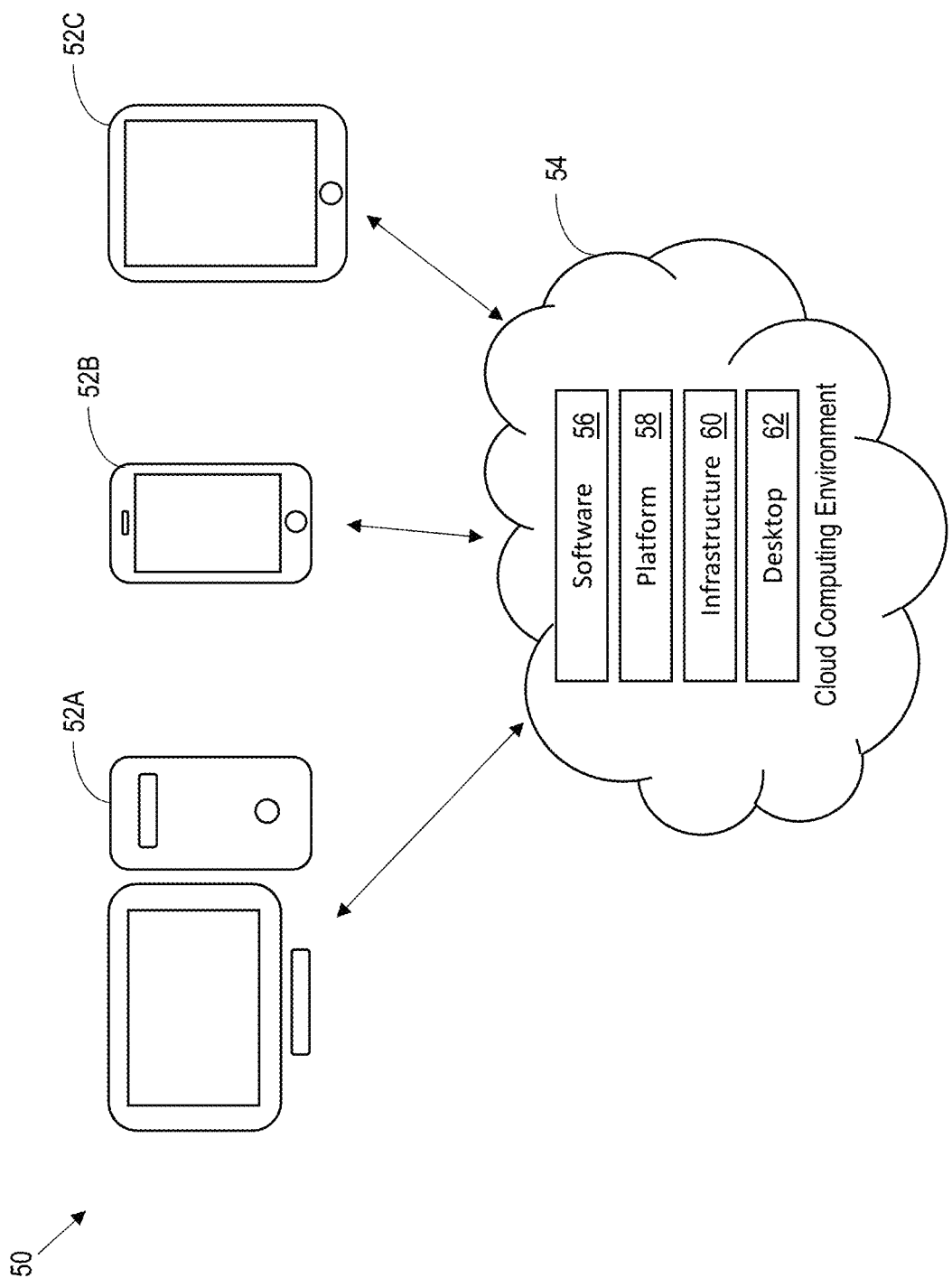
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
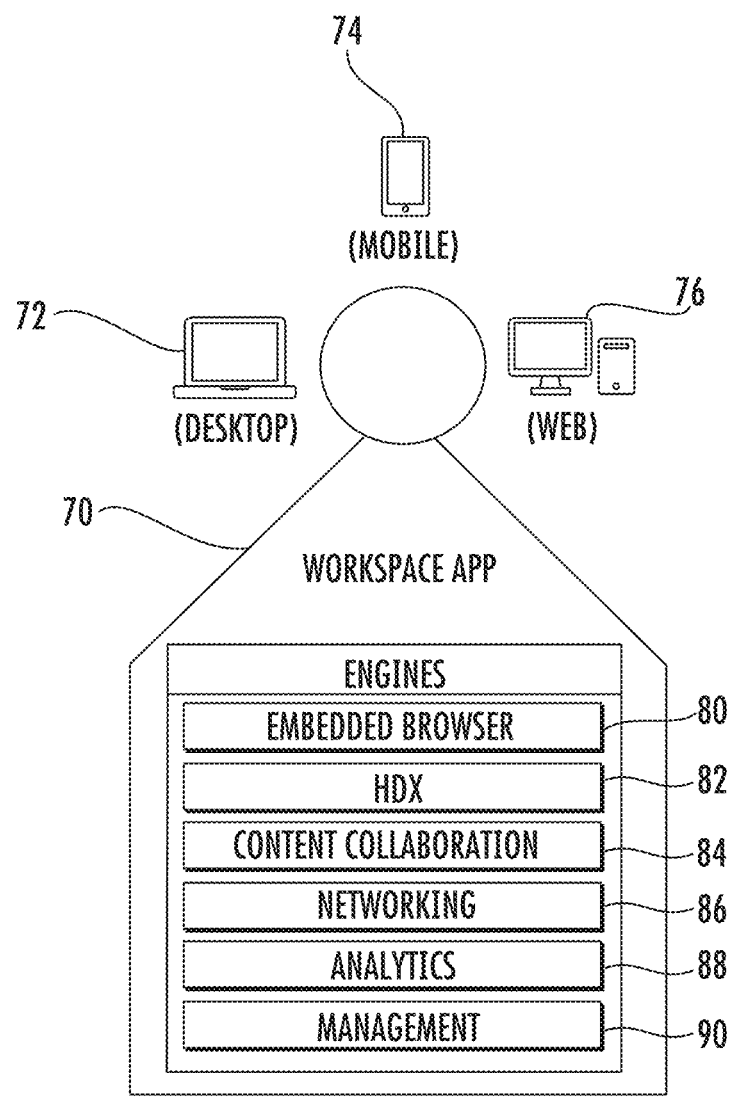
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
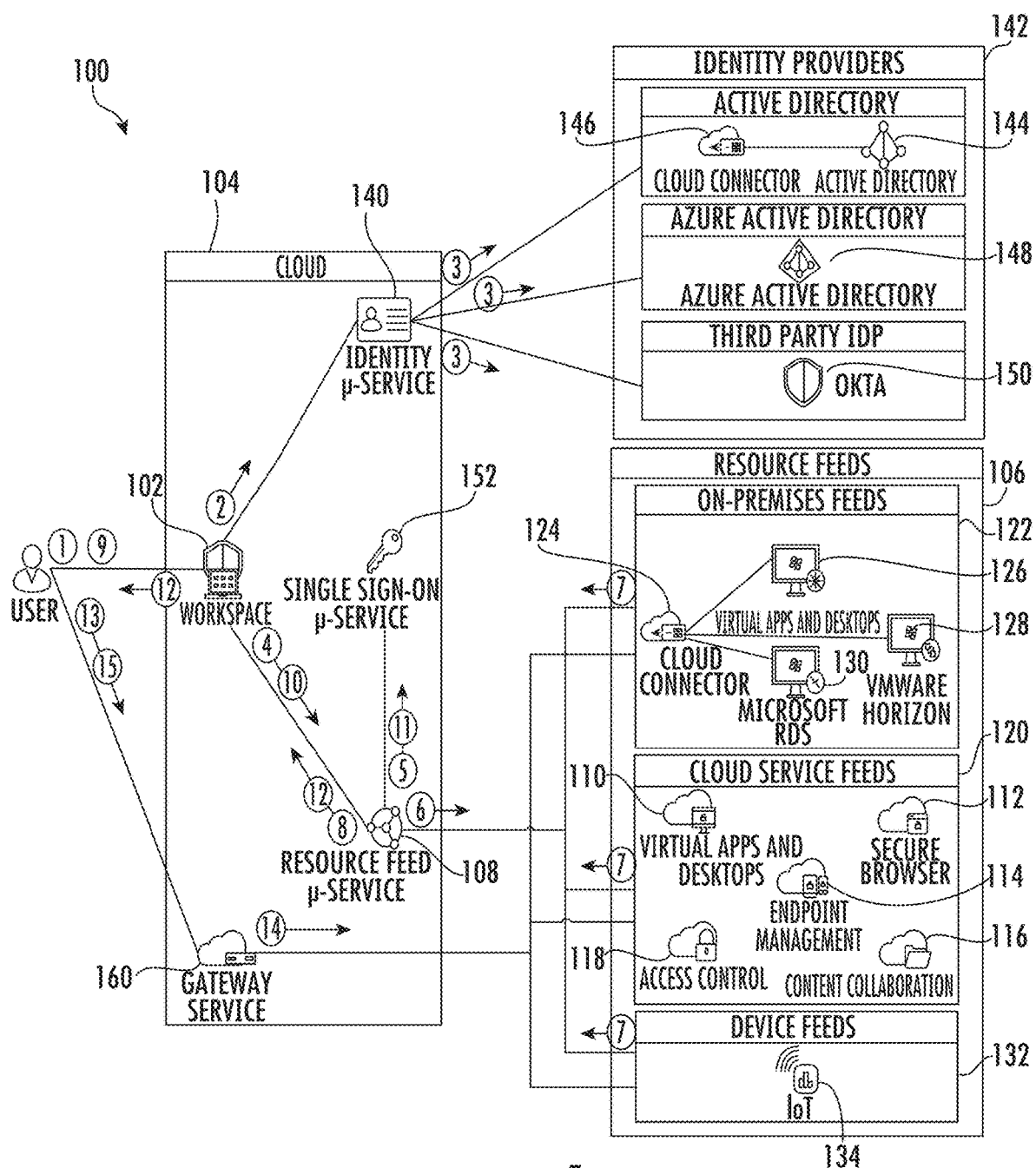
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
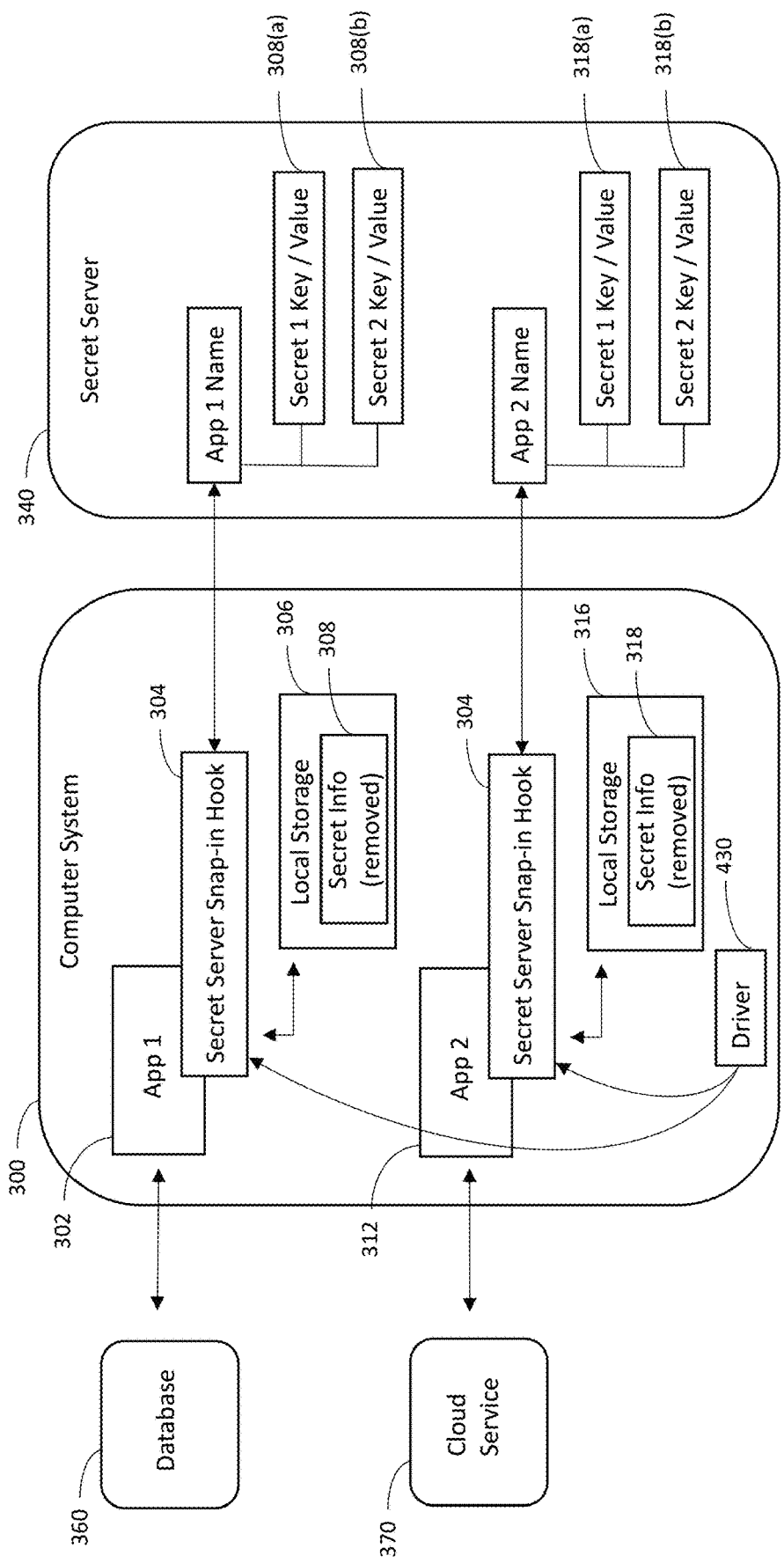
FIG. 6 is a schematic block diagram of a computer system with a secret server snap-in hook in which various aspects of the disclosure may be implemented.

Referring now to FIG. 6, the illustrated computer system 300 provides the ability for applications 302, 312 to retrieve secret information 308(*a*)-308(*b*), 318(*a*)-318(*b*) from a secret server 340 via a secret server snap-in hook 304 instead of from local storage 306, 316 on the computer system 300. The secret information 308, 318 normally stored in the local storage 306, 308 has been replaced with blank information. In other words, the secret information has been removed from the local storage 306, 308 and is to be retrieved from the secret server 340 when a call is made by the applications 302, 312.

The computer system 300 may be a virtual machine (on-premises or cloud-based) or a physical machine. For Windows based operating systems, the local storage 306, 316 provides configuration files and registries. The computer system 300 is not limited to a Windows based operating system, as other types of operating systems may be used, such as Linux, for example.

As will be explained in greater detail below, the secret server snap-in hook 304 is inserted into the applications 302, 312 when the applications are launched or started-up by a processor within the computer system 300. The term snap-in refers to injecting or attaching software code to the applications 302, 312 without changing the underlying code for the applications 302, 312. The secret server snap-in hook 304 basically sits in the middle and intercepts calls for the secret information and redirects the intercepted calls to the secret server 340.

The secret server snap-in hook 304 intercepts all calls (e.g., configuration file and registry calls) made by the applications 302, 312, and determines when one of the calls is for secret information. If the call is for secret information, then the call is intercepted and redirected by the secret server snap-in hook 304 to the secret server 340 in order to retrieve the secret information 308(a)-308(b), 318(a)-318(b) requested by the applications 302, 312. If the call is not a request for secret information, then the secret server snap-in hook 304 allows the call to pass to the configuration file or registry in the local storage 306, 316 so that the contents therein are returned to the applications 302, 312.

Oftentimes applications require secret information to access a desired resource. As an example, App 1 302 is to access a database 360 and App 2 312 is to access a cloud service provider 370. Access to the resource is granted using the secret information. The secret information may be usernames and passwords, database connection strings, and service keys, for example. For comparison purposes, the computer system 300 in FIG. 7 does not use the secret server snap-in hook 304 to retrieve the secret information 308, 318 from a secret server 340.

Figure 7:
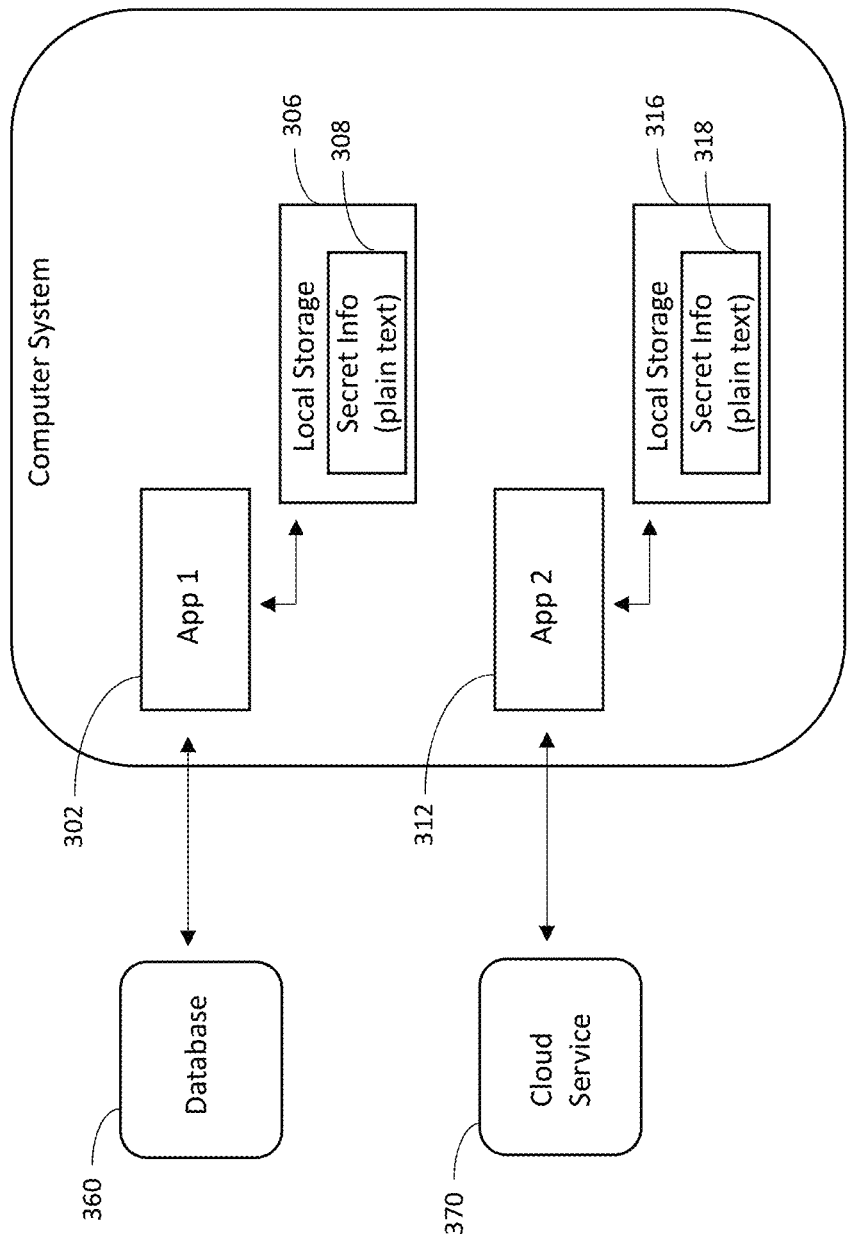
FIG. 7 is a schematic block diagram of the computer system illustrated in FIG. 6 without the secret server snap-in hook.

Instead, App 1 and App 2 in FIG. 7 retrieve the secret information 308, 318 from the local storage 306, 316 on the computer system 300. The secret information 308, 318 is stored in plain or unencrypted text within the local storage 306, 316. Storing the secret information 308, 318 in plain or unencrypted text allows an administrator to go into the computer system 300 and make changes when needed. A disadvantage of storing the secret information 308, 318 in plain text is that anyone else accessing the computer system 300 will be able to read the secret information. For example, a hacker may access the computer system 300 to steal the secret information to use for malicious intent.

One approach to protect the secret information 308, 318 in the local storage 306, 316 is to use encryption. However, App 1 302 and App 2 312 are both expected to retrieve the secret information 308, 318 in plain or unencrypted text. If the secret information 308, 318 was encrypted, the code in App 1 and App 2 would need to be modified to be able to read the encrypted secret information 308, 318. Making changes to application code is a time consuming and labor intensive process, particularly when dealing with a large quantity of applications, which typically include legacy applications.

Referring back to FIG. 6, the secret server snap-in hook 304 allows the secret information 308(a)-308(b), 318(a)-318(b) needed by App 1 302 and App 2 312 to be retrieved from a secret server 340 instead of from the local storage 306, 316. The use of a secret server 340 advantageously safe guards the secret information needed by the computer system 300. The secret server 340 is a system that enables secure storage of data. Configuration data is typically name/value pairs. As an alternative to name/value pairs, the secret server 340 can store a single encoded string, certificates, and other formats dependent on the secret server 340. The secret server 340 may be cloud based to provide a unified interface to the secret information, while providing tight access control and recording a detailed audit log. HashiCorp Vault and Azure Key Vault are example secret servers 340. Another example secret server 340 is a Thycotic Secret Server.

In response to a call being made for the secret information 308(a)-308(b), 318(a)-318(b), the secret-server snap-in hook 304 is configured to intercept the call, determine if the contents should be obtained from the secret server 340, and if so, provide the secret information 308(a)-308(b), 318(a)-318(b) in the secret server 340 to the application 302, 312 making the call. The secret information 308(a)-308(b), 318(a)-318(b) may be retrieved after the call is made (i.e., without caching) or before the call is made (i.e., with caching).

Without caching, the secret-server snap-in hook 304 intercepts the call, making a request to the secret server 340 to retrieve the secret information 308(a)-308(b), 318(a)-318(b) when needed from the secret server 340. This is performed in real-time.

With caching, the secret-server snap-in hook 304 retrieves and caches the secret information 308(a)-308(b), 318(a)-318(b) from the secret server 340 when the secret-server snap-in hook 304 is injected into the application 302, 312. The cached secret information 308(a)-308(b), 318(a)-318(b) is under a protective storage mechanism, such as a credential manager by Windows, that is secure and utilizes the embedded capabilities of the physical hardware of the computer system 300.

Alternatively, the protective storage mechanism may encrypt the secret information 308(a)-308(b), 318(a)-318(b) when stored on the computer system 300 and decrypt when needed by the application 302, 312.

The secret server 340 has a secret 1 key/value 308(a) and a secret 2 key/value 308(b) associated with App 1 302. The name value pair for secret 1 key/value 308(a) may have "username" as the name with the corresponding value being the actual username of the user. The name value pair for secret 2 key/value 308(b) may have "password" as the name with the corresponding value being the actual password of the user. Similarly, the secret server 340 has a secret 1 key/value 318(b) and a secret 2 key/value 318(b) associated with App 2 312. User/password are not to be limiting as any name value pair required by the applications 302, 312 which has sensitive data for the value may be used.

Figure 8:
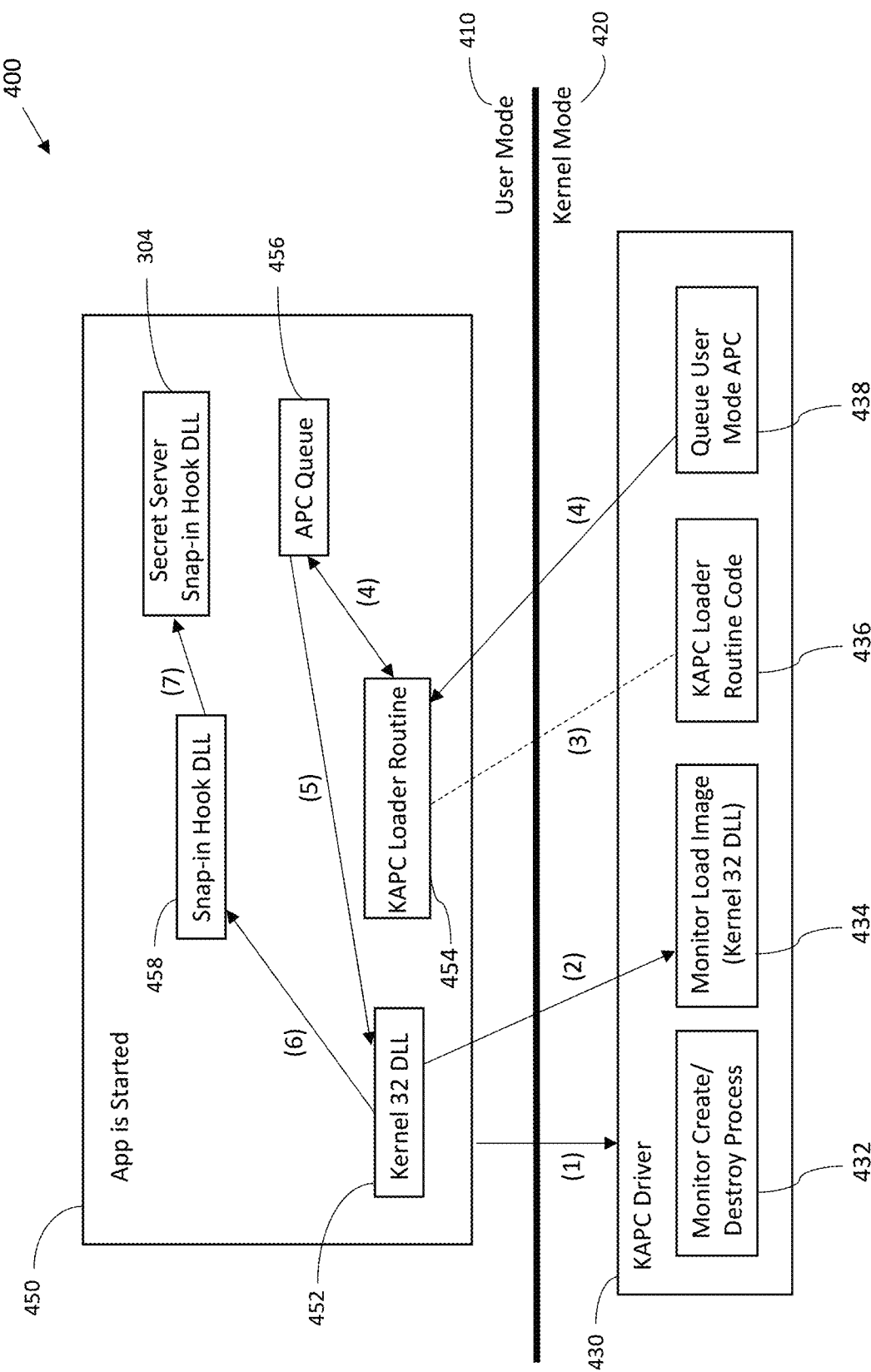
FIG. 8 is a sequence diagram illustrating injection of the secret server snap-in hook into an application on the computer system illustrated in FIG. 6.

Referring now to FIG. 8, a sequence diagram 400 illustrates injection of the secret server snap-in hook 304 into an application 302 by a driver 430. As will be discussed below, the driver 430 is installed on the operating system and will be loaded into all processes (e.g., application 302) in order to support kernel asynchronous procedure calls (KAPC) within the application 302. Injection of the secret server snap-in hook 304 is piggybacked on an asynchronous procedure call made by the application 302. The driver 430 may also be referred to as a KAPC driver or a universal driver.

The operating system of the computer system 300 has a user mode 410 and a kernel mode 420. The memory for the user mode 410 helps the operating system in running applications, such as App 1 302 and App 2 312. The memory for the kernel model 420 is required when the computer system 300 boots and the operating system is loaded. Some of the privileged instructions work in kernel mode only.

An application, such as App 1 302, typically starts in the user mode 410. This corresponds to box 450. Injection of the secret server snap-in hook 304 is done by the KAPC driver 430 running in the kernel mode 420. The KAPC driver 430 includes a monitor create/destroy process module 432 that is notified when App 1 302 is started-up, which corresponds to line (1).

The KAPC driver 430 is a custom universal driver as provided by Citrix Systems, for example, that is used to inject the necessary hooks into App 1 302 so that the application will operate differently than the application would normally operate. The KAPC driver 430 is configured to inject the secret server snap-in hook 304 into any application that utilizes the functions identified in the configuration (see FIG. 14). Once the secret server snap-in hook 304 has been injected, the KAPC driver 430 is dormant until another create/destroy process is detected. In otherwords, the KAPC driver 430 is event driven, and is notified by the operating system when a process is created/destroyed.

The KAPC driver 430 includes a monitor load image module 434. This module 434 is monitoring the usage of a particular DLL (dynamic link library) that the App 1 302 is loading. A DLL file contains a library of functions and other information that can be accessed by App 1 302. When App 1 302 is launched, links to the necessary DLL files are created. In this case, the KAPC driver 430 is monitoring for when a kernel 32 DLL 452 is loaded, which corresponds to line (2).

As will be discussed below in reference to FIG. 14, the monitor actually watches for any of the DLL's identified by this config, and if there is a match, it will inject the hook Dll to replace the function call 524 in the DLL 522 with a call to the hook-dll function 526 and keep track of the original function 528.

The KAPC driver 430 includes a KAPC (kernel asynchronous procedure call) loader routine code module 436. This module 436 in the KAPC driver 430 is mapped to a KAPC loader routine module 454 in the memory of the user mode 410, which corresponds to line (3). The KAPC loader routine module 454 already exists in a Windows based operating system, and is being used to perform the injection. In other words, the injection initiated by the KAPC driver 430 is based off of a KAPC operation.

The KAPC driver 430 includes a queue user mode APC (application program command) module 438, which is associated with the KAPC loader routine module 454 in the user mode 410. The KAPC loader routine module 454 is then associated with an APC queue module 456 in the user mode 410. This joint association corresponds to lines (4). The KAPC loader routine module 454 is only used during the load process to establish the hook. When the application 302 calls the API, the application 302 thinks it is calling Kernel32.DLL→CreateFileA but the KAPC driver 430 previously replaced that with a pointer to HookedCreateFileA so it actually calls HookedCreateFileA directly (see FIG. 14). Since the API call is asynchronous, the KAPC loader routine module 454 queues the API call in the APC queue module 456 until ready for execution.

When the asynchronous call (e.g., initialize memory) in the APC queue module 456 is ready for execution, then it is dequeued from the APC queue module 456 and returned to the kernel 32 DLL 452 at line (5). At this time, the driver 430 injects into the application a snap-in hook DLL 458 at line (6) and the secret server snap-in hook DLL 304 at line (7) into the user mode 410. The snap-in hook DLL 458 and the secret server snap-in hook DLL 304 are piggybacked on top of the asynchronous call being made by the kernel 32 DLL 452.

The snap-in hook DLL 458 is used to intercept and redirect an API call being made by the application for the secret information 308, 318 in the local storage 306, 316. The secret server snap-in hook DLL 304 provides the location within the secret server 340 to retrieve the secret information 308(a)-308(b) that will be returned to the App 1 302 as if the initial API call was made to the local storage 306. In other words, the App 1 302 is not aware that the API call for the secret information 308 is being intercepted and redirected to the secret server 340.

Once the API call has been executed by the kernel 32 DLL module 452, then the snap-in hook 458 and the secret server snap-in hook 304 are loaded into the user mode memory 410. The snap-in hook 458 and the secret server snap-in hook 304 are DLL files. The snap-in hook 458 is to monitor for API calls requesting secret information in the local storage 306, which corresponds to line (6). If a call is requesting secret information, then this call is intercepted and redirected to the secret server snap-in hook 304, which corresponds to line (7). The secret server snap-in hook 304 then contacts the secret server 340 to retrieve the secret information 308(a)-308(b) being requested by the API call.

The KAPC loader routing module 454 is leveraged during the load process to put the secret server snap-in hook 304 in place. The applications 302, 312 are representative of others in the industry, and as such, have a requirement that secrets being consumed by the application will be coming from a file or the Windows registry—at the lowest level. The low level APIs being referenced that will be intercepted include, but are not limited to, CreateFile( ), OpenFile( ), RegOpenKey( ), SHGetValue( ).

Intercepting the low level APIs maximizes the number of uses cases that the secret server snap-in hook 304 can accommodate. Any file accessed by any process on Windows will, at a low-enough level, go through one of the file I/O or Registry I/O API functions. Interception/hooking in user-mode will suffice a majority of the time. However, in the case where a certain process may bypass one of the user-mode APIs mentioned above (e.g., part of another subsystem or runtime adjacent to Win32, such as UWP), then the kernel-mode API will be hooked instead or in addition.

Figure 9:
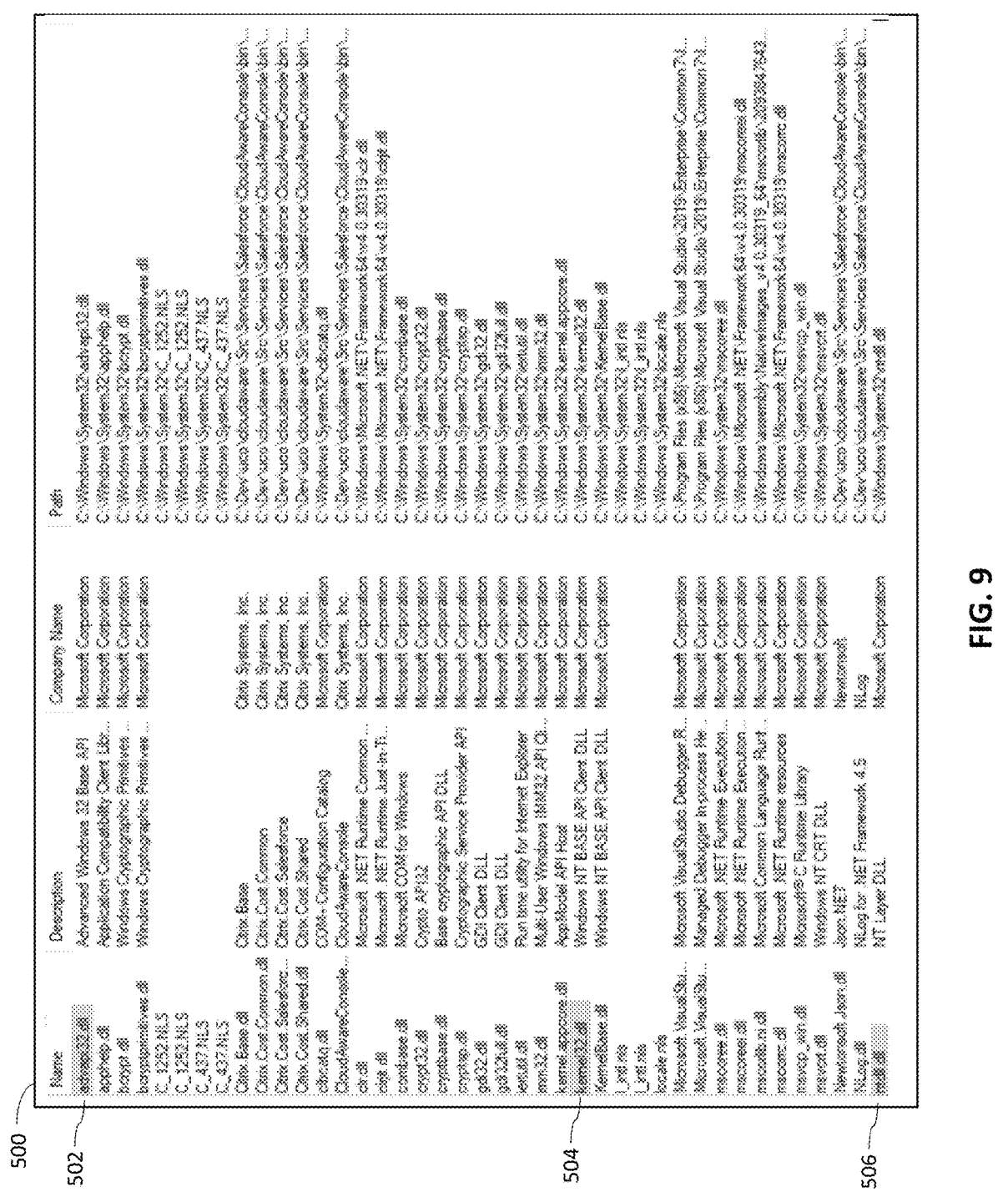

Referring to the example list of DLLs 500 in FIG. 9, these DLLs are loaded when an application, such as App 1 302, is started. Not every DLL is to be hooked. The DLLs that are to be hooked are the ones referenced in the code snippet as illustrated in FIG. 14. The DLLs that are to be hooked include the following: advapi32.dll 502, kernel32.dll 504, and ntdll.dll 506.

The secret server snap-in hook 304 is injected in the path of the highlighted DLLs. For discussion purposes, these DLLs have many functions and the ones defined in FIG. 14 are hooked. For the hooked DLLs, the secret server snap-in hook 304 intercepts API calls for the secret information and redirects to the secret server 340. If an API call from one of the hooked DLLs does not request the secret information, then that API call is passed to the local storage 306 on the computer system 300.

Referring now to FIGS. 10-13, various flow diagrams illustrating operation of the secret server snap-in hook 304 will be discussed. The secret server snap-in hook 304 will be "hooked" into a given process to intercept calls (via low-level APIs) to retrieve the secret information 308(a)-308(b), 318(a)-318(b) from the secret server 340 instead of from configuration files or registries in the local storage 306, 316 on the computer system 300.

Figure 10:
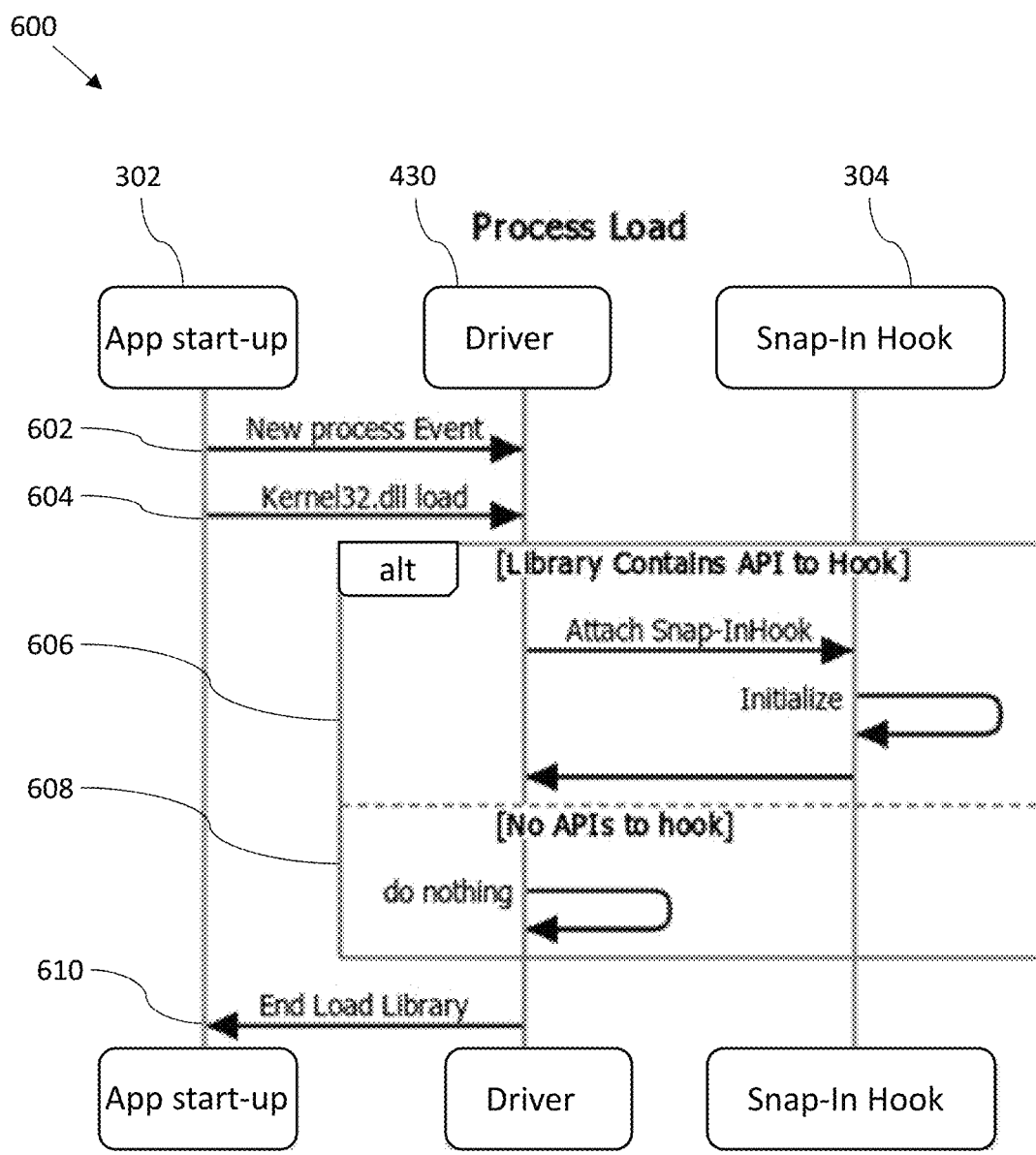
FIG. 10 is a process load flow diagram for the secret server snap-in hook operating on the computer system illustrated in FIG. 6.

A process load flow diagram 600 is provided in FIG. 10, which is loading of the secret server snap-in hook 304 into an application, such as App 1 302. The driver 430 is notified of a new process event at line 602. The new process event may be start-up of App 1 302, for example.

Figure 14:
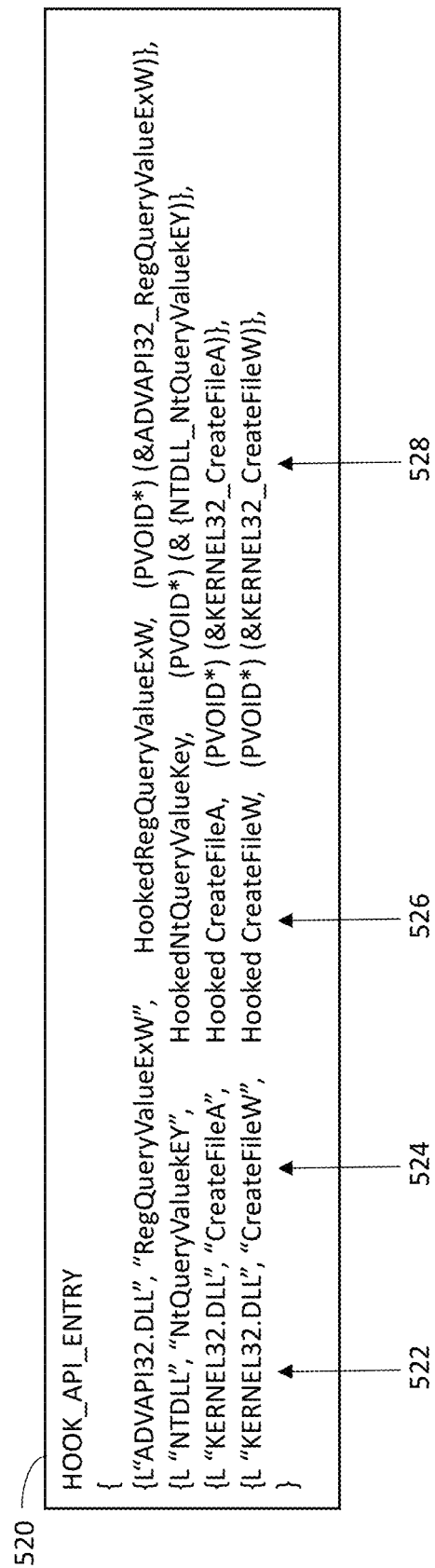
FIG. 14 provides a list of DLLs and corresponding API calls that are to be hooked for an application on the computer system illustrated in FIG. 6.

The driver 430 is monitoring the DLL load event looking for a DLL that matches any contained in the list illustrated in FIG. 14. As discussed above, the driver is monitoring for any DLL identified in FIG. 14 to be loaded. If any DLL identified in the KAPC configuration (see FIG. 14) is being loaded, then the secret server snap-in hook 304 is injected into App 1 302, as represented in box section 606. If kernel 32 DLL 452 does not include API calls for the secret information 308 in the local storage 306, then the secret server snap-in hook 304 is not injected into App 1 302, as represented in box section 608. Completion of loading the kernel 32 DLL 452 is at line 610.

Figure 11:
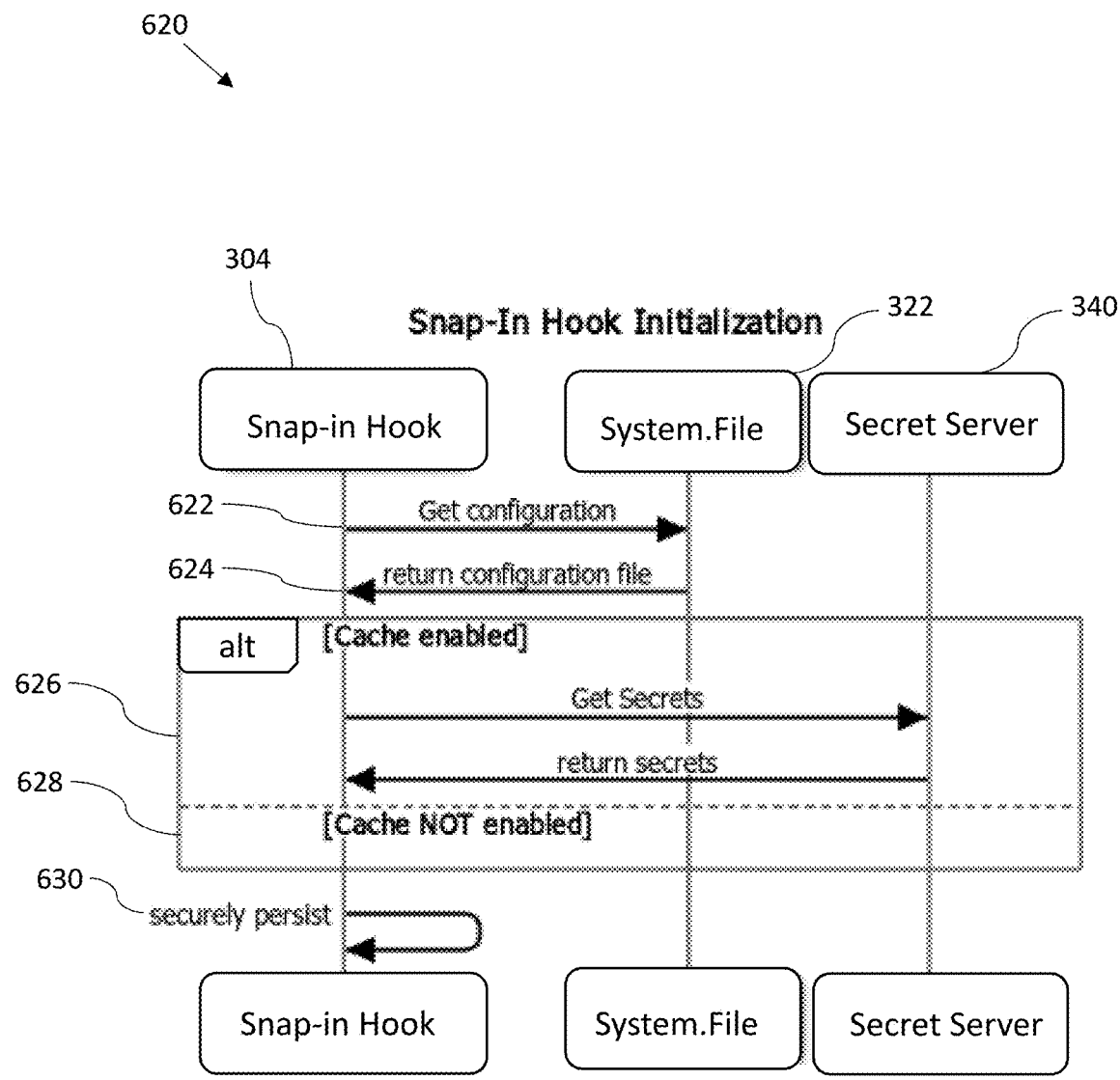
FIG. 11 is an initialization flow diagram for the secret server snap-in hook loaded in FIG. 10.

An initialization flow diagram 620 is provided in FIG. 11, which is initialization of the secret server snap-in hook 304. The initialization occurs when the secret server snap-in hook 304 is loaded. The secret server snap-in hook 304 includes allocation code for an application writer to change the application configuration when the KAPC driver 430 is installed and the secret server snap-in hook 304 configuration file is created.

The secret server snap-in hook 304 may be configured with cache enabled or with cache not enabled. If the secret information 308 (a)-308 (b), 318 (a)-318 (b) is to be cached, as represented in box section 626, then the secret server snap-in hook 304 retrieves the secret information 308(a)-308(b), 318(a)-318(b) from the secret server 340. If the secret information 308 (a)-308 (b), 318 (a)-318 (b) is not to be cached, as represented in box section 628, then the secret server snap-in hook 304 retrieves the retrieves the secret information 308(a)-308(b), 318(a)-318(b) from the secret server 340 when needed.

Caching allows for App 1 302 or App 2 312 to more quickly receive the secret information 308(a)-308(b), 318(a)-318(b) when requested. The cached secret information 308(a)-308(b), 318(a)-318(b) is not stored on the computer system 300 in plain text as done in local storage 306, 316.

The cached secret information 308(a)-308(b), 318(a)-318(b) is stored using a protective storage mechanism, such as a credential manager. The protective storage mechanism may encrypt the secret information 308(a)-308(b), 318(a)-318(b) when stored on the computer system 300 and decrypted when needed by App 1 302 and App 2 312. If the secret information 308(a)-308(b), 318(a)-318(b) is cached, then this information is securely persisted at line 630.

Figure 12:
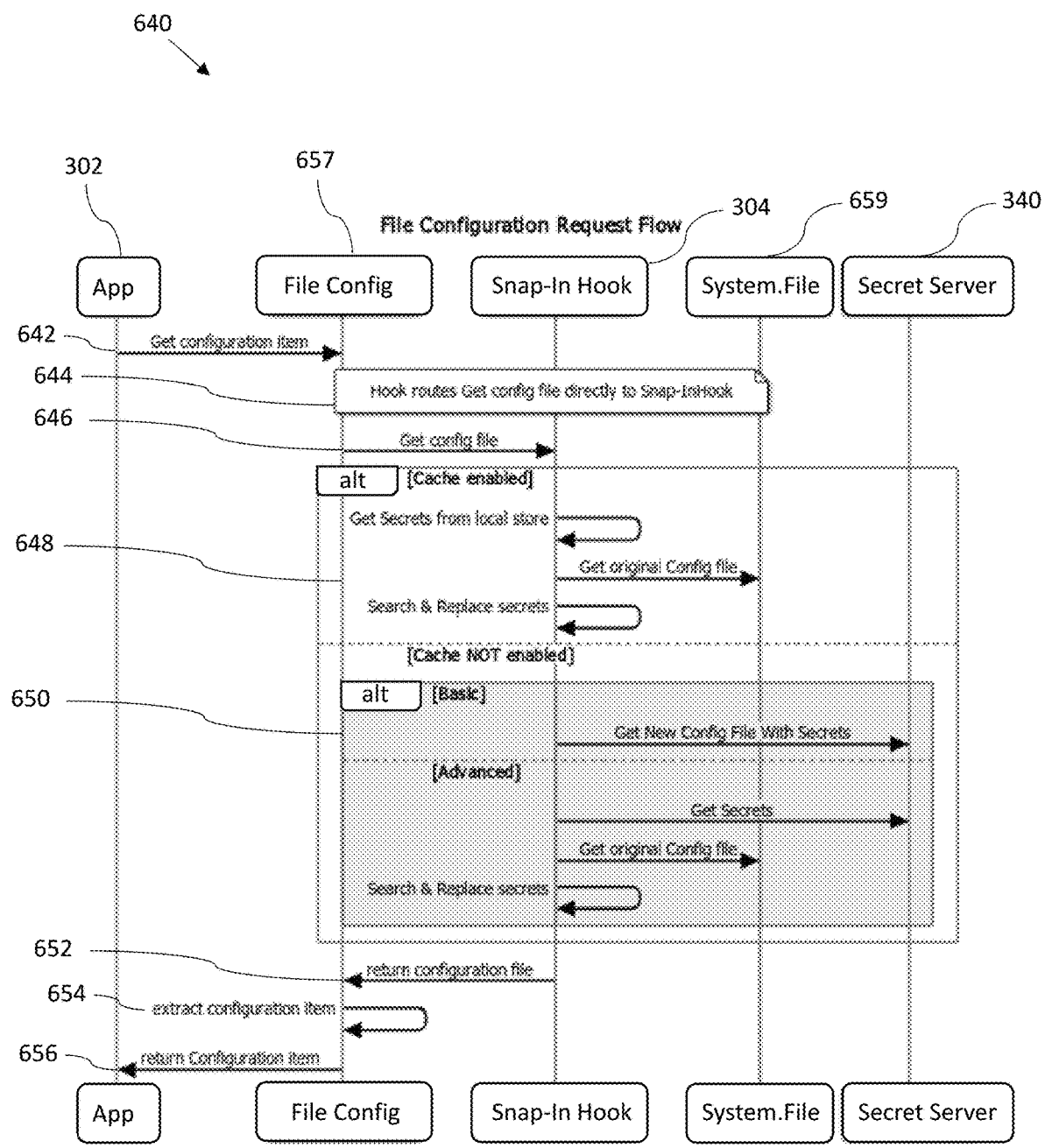
FIG. 12 is a file configuration request flow diagram using the secret server snap-in hook loaded in FIG. 10.
Figure 13:
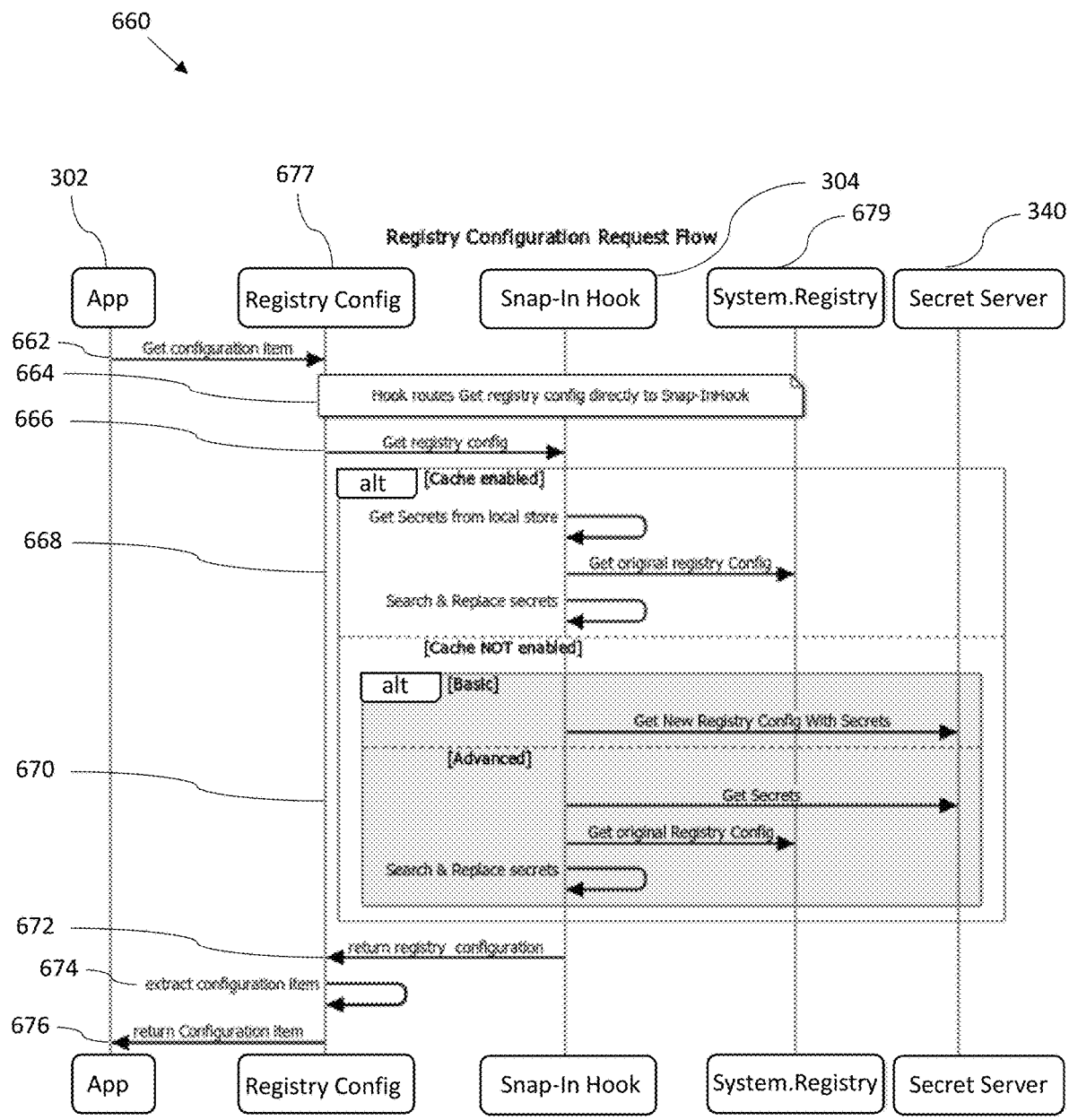
FIG. 13 is a registry configuration request flow diagram using the secret server snap-in hook loaded in FIG. 10.

A file configuration request flow diagram 640 is provided in FIG. 12, which is App 1 302 making an API call to for a configuration file 657 in the local storage 306. An API call for a configuration item is made by App 1 302 at line 642. For a system file 659 on the computer system 300, a hook within the DLL designated in FIG. 14 (e.g., Kernel32, AdvApi32, NtDll) routes the API call to the secret server snap-in hook 304 at line 644. The secret server snap-in hook 304 is to make the call for the configuration file at line 646.

The cache may be enabled, as represented in box section 648. If the cache is enabled, the secret information 308(a)-308(b) is retrieved from a local store on the computer system 300. The secret server snap-in hook 304 then receives the original configuration file, and performs a search and replace for the blank information 308 in the configuration file 657 with the cached secret information 308(a)-308(b).

Alternatively, the cache may not be enabled, as represented in box section 650. If the cache is not enabled, a basic or an advanced operation may be performed by the secret server snap-in hook 304.

The basic operation involves the secret server snap-in hook 304 retrieving the entire configuration file stored in the secret server 340. The entire configuration file includes the secret information 308(a)-308(b) as well as non-secret information.

The advanced operation involves the secret server snap-in hook 304 retrieving only the secret information 308(a)-308(b) from the secret server 340. The secret server snap-in hook 304 then receives the original configuration file, and performs a search and replace for the blank information 308 in the configuration file 657 with the cached secret information 308(a)-308(b).

The configuration file with the secret information 308(a)-308(b) from the secret server 340 is returned at line 652. The request by App 1 302 is for a configuration file at line 654, and is retuned to App 1 302 at line 656. A registry configuration request flow diagram 660 is provided in FIG. 13, which is App 1 302 making an API call for registry information 677. An API call for a configuration item is made by App 1 302 at line 662. For a system registry 679 on the computer system 300, a hook is associated with a DLL (e.g. AdvApi32.dll or NT.dll) as defined in FIG. 14 and routes the API call to the secret server snap-in hook 304 at line 664. The secret server snap-in hook 304 is to make the call for the registry at line 666.

The cache may be enabled, as represented in box section 668. If the cache is enabled, the secret information 308(a)-308(b) is retrieved from a local store on the computer system 300. The secret server snap-in hook 304 then receives the original registry information, and performs a search and replace for the secret information 308 in the registry 677 with the cached secret information 308(a)-308(b).

Alternatively, the cache may not be enabled, as represented in box section 670. If the cache is not enabled, a basic or an advanced operation may be performed by the secret server snap-in hook 304.

The basic operation involves the secret server snap-in hook 304 retrieving the entire registry section stored in the secret server 340. The entire registry includes the secret information 308(a)-308(b) as well as non-secret information.

The advanced operation involves the secret server snap-in hook 304 retrieving only the secret information 308(a)-308(b) from the secret server 340. The secret server snap-in hook 304 then receives the original registry information, and performs a search and replace for the secret information 308 in the registry 677 with the cached secret information 308(a)-308(b).

The registry information with the secret information 308(a)-308(b) from the secret server 340 is returned at line 672. The secret information 308(a)-308(b) needed by App 1 302 is extracted from the registry information at line 674, and is retuned to App 1 302 at line 676.

FIG. 14 provides a list 520 of the DLLs and the corresponding API calls that are to be hooked. Column 522 identifies by name the particular DLLs that are to be hooked/replaced by the secret server snap-in function 526. Column 524 identifies by name the particular function within the DLL (in column 522) that is to be replaced, i.e., hooked. Column 526 identifies by name the actual function that will be called within the secret server snap-in hook 304 to obtain the secret information 308(a)-308(b) from the secret server 340.

FIG. 15 provides instructions 540 on configuration of the secret server snap-in hook 304 for an application named sample. The configuration may be separated into a local section 542 and a remote section 544.

In the local section 542, a local configuration provider determines the type of interface that is being used to access the configuration that contains the secret information for the sample application. This will be used by the associated secret server snap-in hook 304.

The configuration provider may be file or registry. The sample application may reference the configuration file or the registry for the secret information 308 in the local storage 306. This is dependent upon the application. In this case, the secret information 308 is in a file, and the file is located at c:\\sample\\config.json.

In the remote section 544, a remote configuration type determines which secret service interface should be used when obtaining the secret information 308(a)-308(b). The secret service interface, for example, may be an Azure Key Vault or a Hashi Corp Vault.

In this case, the Azure Key Vault is to be selected, and the secret information 308(a)-308(b) in the secret server 340 is located at sample.config.json path. The remote configuration connection contains the information required by the secret service provider to establish a connection. The secret names are the actual configuration names within the configuration file or registry as determined by the local configuration provider.

The above configuration includes enough information to accommodate basic as well as advanced operations. An advanced operation would provide capabilities for caching secrets, receiving notifications of secret updates (e.g., for rotation purposes), as well as credentials for accessing the secret server.

Although the secret server snap-in hook 304 provides for additional flexibility, there are two scenarios for the in-hook algorithm: File and Registry. In both cases, allowed list "white-list" or "allowed list" of configuration paths (files in file scenario and specific secrets in registry scenario) is defined.

In the first case, the File hook will get called upon each file open call. When the hook is invoked it will be passed the full file path (e.g., "c:\sample\config.json"), and a simple lookup will be done within the snap-in configuration as defined above. If the configuration file contains a match, then the secret server logic will be invoked for the file open. In the simplest form, it means the entire contents of the configuration file will be read. This can be written to a secure hidden file for simplicity.

In the second case, the Registry hook will get called upon each Registry Query Value call. When the hook is invoked, similar to the file hook, it will be passed the full registry path (e.g., "HKLM\Software\Citrix\SampleApp\Secret1"), and a simple lookup will be done within the snap-in configuration. If the configuration file contains a match, then the secret server logic will be invoked for the registry query value. In the simplest form, it means the individual secret value will be read and returned. It could also be cached locally in a secure store.

As part of the snap-in process, several assumptions may be made to simplify the process. One assumption is that the secret server snap-in hook 304 will be running in a user context capable of accessing the local file and registry system. Another assumption is that the secret-server snap-in hook 304 is configured with credentials able to access the given secret server 340.

If there is no caching initially, a more advanced solution involves the built-in Windows credential manager (i.e., wallet) being used as a cache. An in storage dictionary of secure strings could be used as a cache. An event handler could be established to receive secret updates and update the local cache to support automated secret rotation. A startup task could communicate with the secret server 340 at boot time to perform an initial read of all secrets being handled by the secret server snap-in hook 304.

Figure 16:
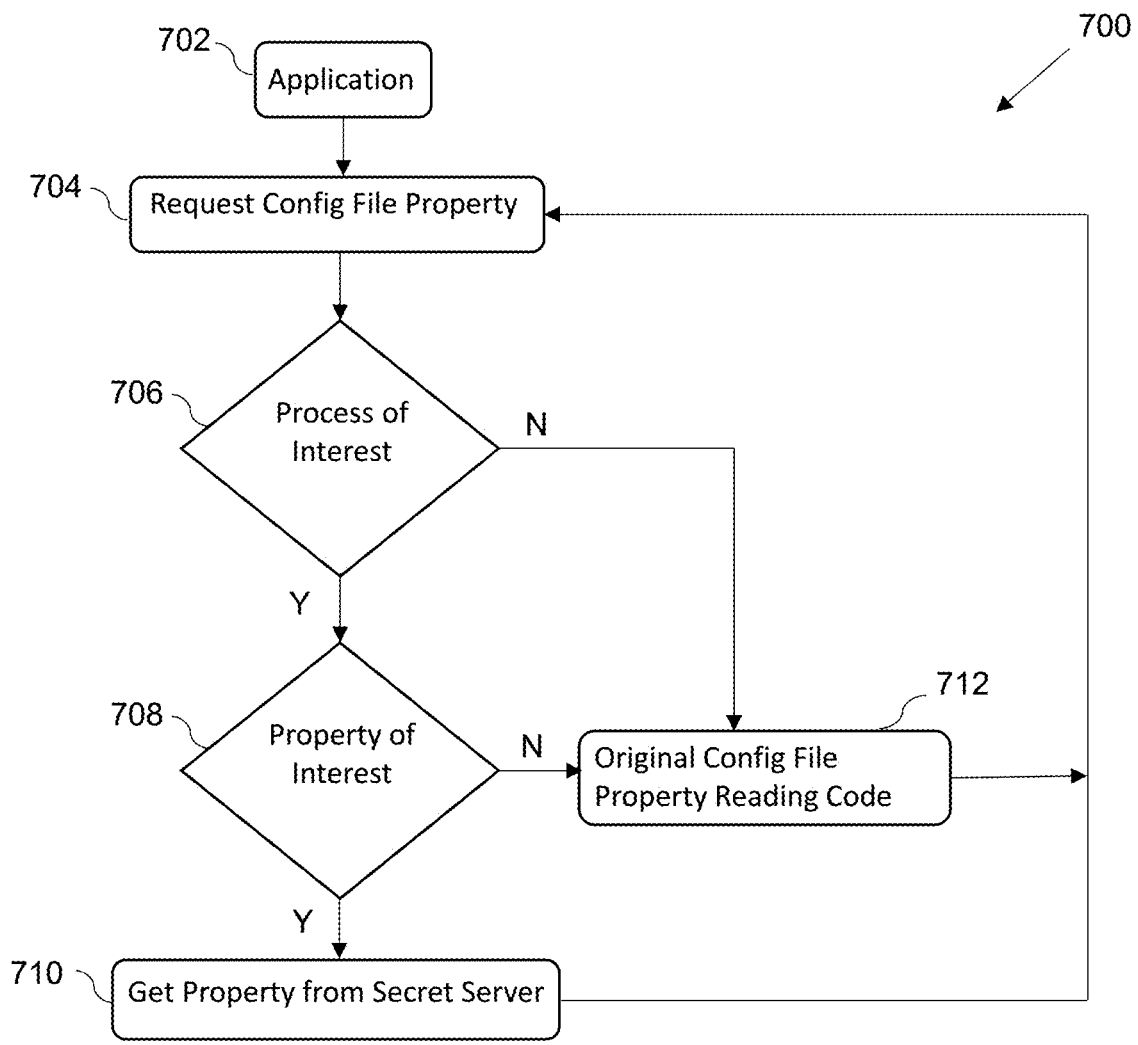
FIG. 16 is a simplified flow diagram for the secret server snap-in hook on the computer system illustrated in FIG. 6.

Referring now to FIG. 16, a simplified flow diagram 700 involving the secret server snap-in hook 304 will be discussed. This is a high level process view and assumes that the secret server snap-in hook 304 is in place. The simplified flow diagram 700 is meant to provide a logical flow of the process without showing the added complexity of the modules being hooked and redirections to the secret server 340.

The secret server snap-in hook 304 has a configuration file that defines the name of the application and the property names that should be obtained from the secret server 340. When the application (e.g., App 1 302) is started in Block 702, the driver 430 will inject the secret server snap-in hook 304 into the application.

When the application 302 makes a request for the configuration file in Block 704, the secret server snap-in hook 304 will intercept the call and perform a series of steps. In decision Block 706, a determination is made if the call is from a process of interest (e.g., the secret server snap-in hook 304 is in place). If no, the call will be forwarded to the original configuration file reading code in Block 712. The value for the property obtained from the local storage 306 will be returned to Block 704.

If yes, a determination is then made in decision Block 708 if the property of interest is to be obtained from the secret server 340. If the property of interest is to be obtained from the secret server 340, the secret server 340 will be called in Block 710 and the value for the property obtained from the secret server 340 will be returned to Block 704. If the property of interest is not to be obtained from the secret server 340, the call will be forwarded to the original configuration file reading code in Block 712. The value for the property obtained from the local storage 306 will be returned to Block 704.

Figure 17:
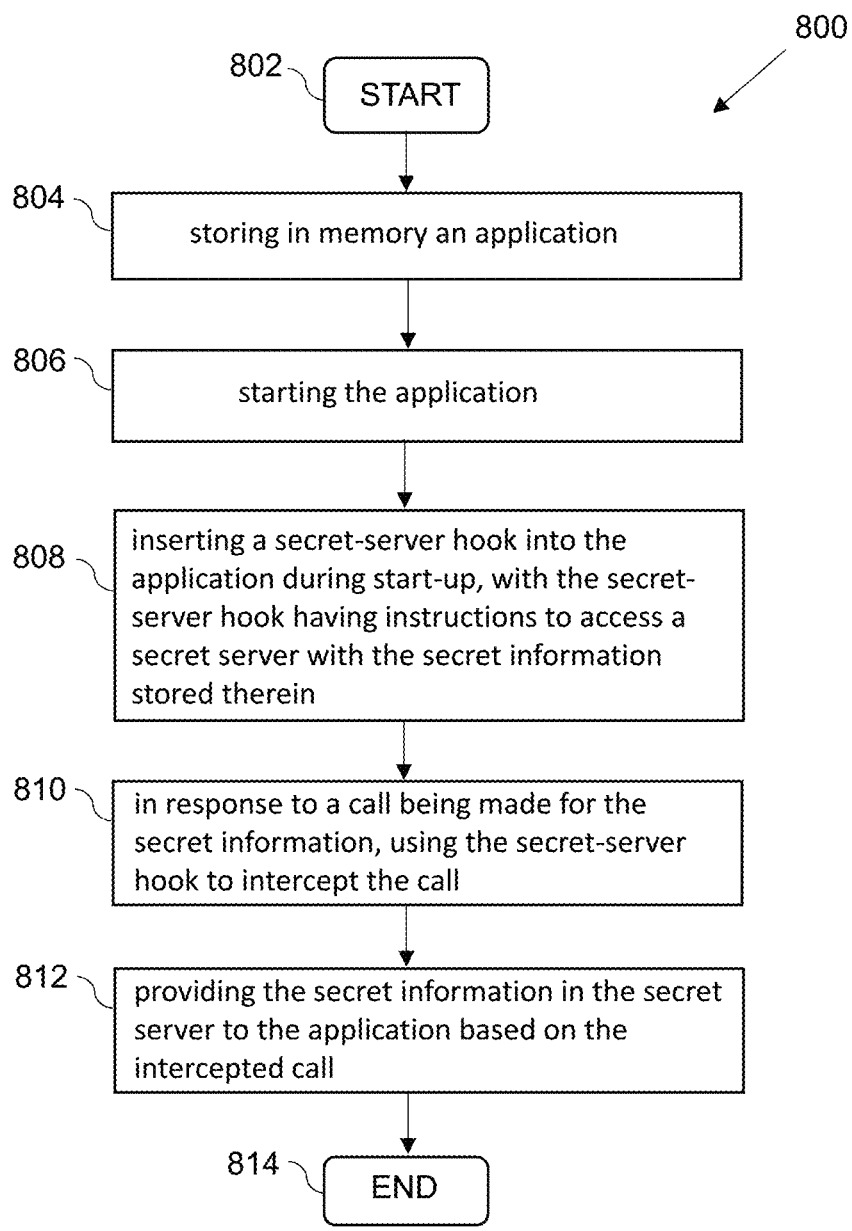
FIG. 17 is a flowchart illustrating a method for operating the computer system illustrated in FIG. 6.

Referring now to FIG. 17, a flowchart 800 illustrating a method for operating the computer system 300 will be discussed. From the start (Block 802), the method includes storing in memory in Block 804 an application 302.

The method further includes operating a processor coupled to the memory to start the application in Block 806, and insert a secret-server snap-in hook 304 into the application 302 during start-up. The secret-server snap-in hook 304 has instructions to access a secret server 340 with secret information 308(a)-308(b) stored therein. In response to a call being made for the secret information 308 in Block 810, the secret-server hook 304 intercepts the call. The secret information 308(a)-308(b) in the secret server 340 is provided to the application 302 based on the intercepted call in Block 812. The method ends at Block 814.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computer system comprising:
   a memory configured to store an application; and
   a processor coupled to said memory and configured to perform the following:
      start the application,
      insert a secret-server hook into the application during start-up, with the secret-server hook having instructions to access a secret server with secret information stored therein, and
      in response to a call being made by the application for the secret information, the secret-server hook has further instructions to perform the following:
         intercept the call, and
         provide the secret information in the secret server to the application based on the intercepted call.

2. The computer system according to claim 1 wherein after the call is made for the secret information, the secret-server hook has further instructions to redirect the intercepted call to the secret server to retrieve the secret information from the secret server.

3. The computer system according to claim 1 wherein before the call is made for the secret information, the secret-server hook has further instructions to retrieve and cache the secret information from the secret server.

4. The computer system according to claim 3 wherein the secret information is cached using a protective storage.

5. The computer system according to claim 1 wherein the call being made for the secret information is directed to a configuration file or registry that includes blank information instead of the secret information initially stored therein, and after interception of the call, the secret-server hook has further instructions to search and replace the blank information in the configuration file or registry with the secret information from the secret server, and return an updated configuration file or registry to the application.

6. The computer system according to claim 1 wherein the call being made for the secret information is directed to a configuration file or registry, wherein the secret server is configured to store the same configuration file or registry, and after interception of the call, the secret-server hook has further instructions to return the configuration file or registry from the secret server to the application.

7. The computer system according to claim 1 wherein the secret information in the secret server is stored as at least one of name value pairs, a single encoded string, and a format dependent on the secret server.

8. The computer system according to claim 1 wherein said memory and said processor are in a virtual machine.

9. The computer system according to claim 1 wherein the secret information is needed by the application to access a resource external the computer system.

10. A method comprising:
    storing in memory an application; and
    operating a processor coupled to the memory to perform the following:
       start the application,
       insert a secret-server hook into the application during start-up, with the secret-server hook having instructions to access a secret server with secret information stored therein, and
       in response to a call being made for the secret information, the secret-server hook has further instructions to perform the following:
          intercept the call, and
          provide the secret information in the secret server to the application based on the intercepted call.

11. The method according to claim 10 wherein after the call is made to for the secret information, the secret-server hook has further instructions to redirect the intercepted call to the secret server to retrieve the secret information from the secret server.

12. The method according to claim 10 wherein before the call is made for the secret information, the secret-server hook has further instructions to retrieve and cache the secret information from the secret server.

13. The method according to claim 12 wherein the secret information is cached using a protective storage.

14. The method according to claim 10 wherein the call being made for the secret information is directed to a configuration file or registry that includes blank information instead of the secret information initially stored therein, and after interception of the call, the secret-server hook has further instructions to search and replace the blank information in the configuration file or registry with the secret information from the secret server, and return an updated configuration file or registry to the application.

15. The method according to claim 10 wherein the call being made for the secret information is part of a configuration file or registry, wherein the secret server is configured to store the same configuration file or registry, and after interception of the call, the secret-server hook has further instructions to return the configuration file or registry from the secret server to the application.

16. A computing system comprising:
    a secret server with secret information stored therein, with the secret information required by an application to access a resource; and
    a computer system comprising:
    a memory configured to store the application; and
    a processor coupled to said memory and configured to perform the following:
       start the application,
       insert a secret-server hook into the application during start-up, with the secret-server hook having instructions to access said secret server for the secret information stored therein, and
       in response to a call being made by the application for the secret information, the secret-server hook has further instructions to perform the following:

intercept the call, and
provide the secret information in said secret server to the application based on the intercepted call.

17. The computing system according to claim 16 wherein after the call is made for the secret information, the secret-server hook has further instructions to redirect the intercepted call to said secret server to retrieve the secret information from said secret server.

18. The computing system according to claim 16 wherein before the call is made for the secret information, the secret-server hook has further instructions to retrieve and cache the secret information from said secret server.

19. The computing system according to claim 16 wherein said memory and said processor are in a virtual machine.

20. The computing system according to claim 16 wherein the secret information is needed by the application to access a resource external the computer system.

\* \* \* \* \*